Figure 1B:
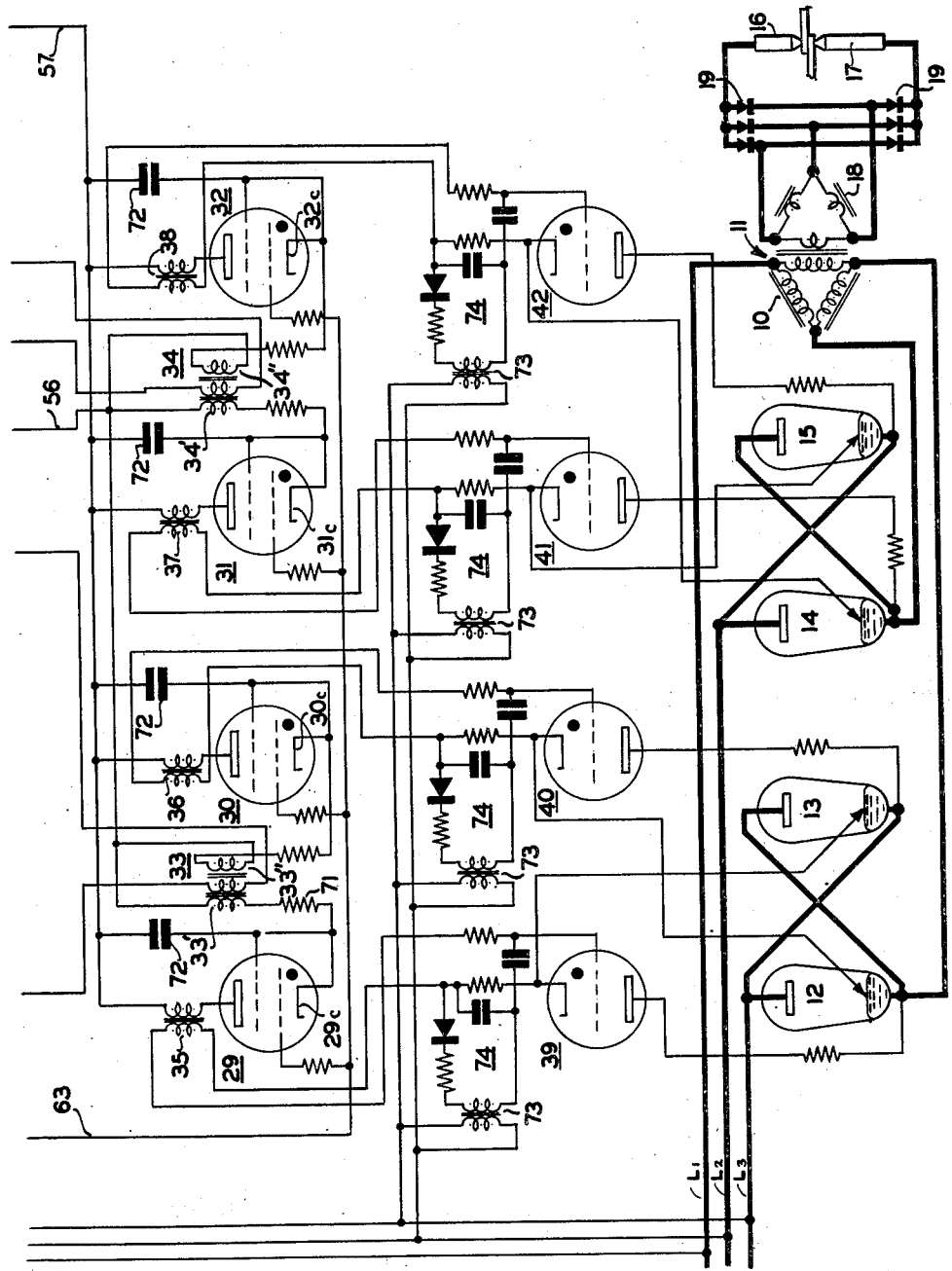

Inventors
JOSEPH J. RILEY
WILLIAM S. DUSTMAN

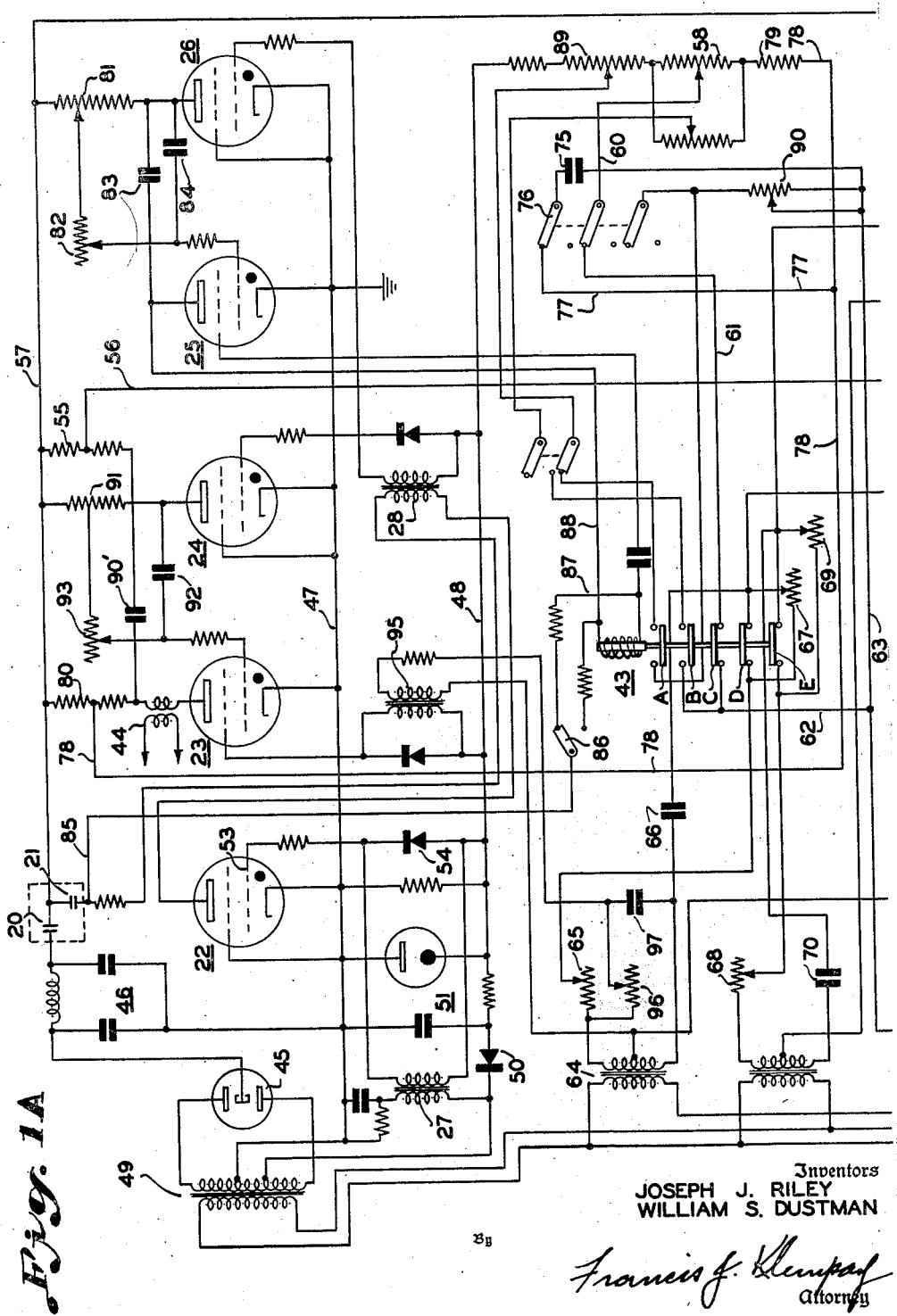

Patented Jan. 19, 1954

2,666,888

UNITED STATES PATENT OFFICE 2,666,888

VOLTAGE CONTROL CIRCUIT FOR WELDING APPARATUS

Joseph J. Riley and William S. Dustman, Warren, Ohio, assignors to The Taylor-Winfield Corporation, Warren, Ohio, a corporation of Ohio Application May 31, 1951, Serial No. 229,246

10 Claims. (Cl. 323—58)

This invention relates to electrical power control apparatus and more particularly to improved control circuits for lending a wide versatility to the control of the flow of electrical energy to a translating device, such as a resistance welding machine for example. The invention herein has its greatest utility in the resistance welding field and is especially useful in controlling the flow of three-phase power to the transformer or transformers used to furnish low-voltage alternating current to full-wave rectifiers of the metallic disc type whereby precisely controlled direct current may be applied to the welding electrodes in effecting the welds. Resistance welding systems of the dry rectifier type are in wide-spread use throughout industry and when properly constructed are highly advantageous in work requiring a high degree of consistency in quality of welds due to the self-regulating characteristic of the system, the reduction in adverse effects of variations in the impedance of the welding circuit, better heat and current distribution in the work, and reduced electrode wear and electrode pickup. Additional advantages are obtained when three-phase power is employed since then a more persistent welding energy flow is obtained, particularly if full-wave rectifiers are employed, and since a balanced load may be drawn from the three-phase power supplied. The persistent unidirectional nature of the welding current flow in such three-phase machines further enhances the potential of consistency of high-quality welds and, accordingly, this welding system has been found to be eminently suitable for precision welding such as is required for aluminum in the aircraft industry, for example.

It is the primary object of the present invention to provide an improved control system for power transmission devices which is capable of controlling the flow of three-phase power to a translating device or to a load such as resistance welder rectifiers in such manner that the rate of rise and/or decay of the current transmitted as well as the duration of and intensity of the current may be readily controlled with a high degree of precision and consistency. Further, the invention provides control instrumentalities for the purposes indicated which are capable of being readily integrated with other control apparatus of the complete welding machine, such as a sequence timer, for example, which organizes the proper sequential actuations of various mechanical parts of the machine to thereby provide a complete system which may be readily adjusted and controlled with infinite precision to provide the best possible welding schedule for the particular work in hand.

Another object of the present invention is the simplification of control apparatus capable of effecting a schedule of control as mentioned above to the end that the system will be entirely reliable in operation and will be readily usable in all its aspects, by the welding machine operators in the field.

More specifically, the invention provides an improved and simplified control circuit for three-phase power whereby the times of initiation and interruption of the current flow may be related to the cycles of the source to effect precision in the quantity of energy translated and to avoid undesirable transients in any magnetic load device such as welding transformers, for example, and to avoid possible saturation of the magnetic load devices, all as has been heretofore accomplished in single-phase equipment but inadequately provided for in multiple-phase equipment. Simultaneously, the control system herein can predetermine the rate of rise and/or the rate of decay of the end use current independently of or in conjunction with the impedance of the load while enabling the intensity of the steady-state current to be readily adjusted and controlled as desired.

While certain of the improved control instrumentalities of the present invention are applicable to single-phase resistance welders and/or to power control systems generally, the application of the principles of the invention to resistance welders of the three-phase full-wave dry rectifier type is of outstanding advantage because the great versatility added to this desirable type of welding equipment while yet retaining a high degree of reliability and while not deteriorating any of the otherwise advantageous characteristics inherent in such welding systems.

The above and other objects and advantages of the invention will become apparent upon consideration of the following detailed specification and the accompanying drawing wherein there is disclosed a certain preferred embodiment of the invention.

In the single figure of the drawing (on two sheets) L1, L2 and L3 represent the principal supply conductors of the apparatus which in accordance with the principles of the invention are connected to a three-phase power supply. Conductor L1 is connected directly to the primary 10 of a welding transformer 11, while conductors L2 and L3 each pass through a pair of inversely connected ignitron type valves and thence are connected to the primary winding 10 in conventional three-phase relationship. As shown, valves 12 and 13 control the flow of current through conductor L3 while valves 14 and 15 similarly control the current flow through the conductor L2. Electrodes 16 and 17 are connected, through a series of rectifiers to the low-voltage secondary winding 18 of the transformer 11. When the valves 12—15 are rendered conducting three-phase welding current will flow from the secondary 18 of transformer 11. Rectifiers 19 provide a unidirectional current flow to the electrodes 16 and 17 to accomplish the weld.

An overall picture of the control system of my invention which is operative to render valves 12—15 conducting is as follows: Switches 20 and 21 are closed and valve 22 is thereupon rendered conducting by an impulse from transformer 27, which is of the peaking type. Firing of valve 22 sends a like impulse to transformer 28, which also is of the peaking type. The impulse to transformer 28 causes valves 24 and 26 to fire to time the duration of the weld.

Closing of switch 20 and firing of tube 24 causes plate voltage and D. C. grid bias to be applied to oscillators 29, 30, 31 and 32 which then fire in response to an alternating voltage which is impressed upon the cathodes of the respective oscillators by means of transformers 33 and 34. It will be noted that transformers 33 and 34 receive voltage impulses in controlled phase relationship with that across the associated valves 12, 13, 14 and 15. Firing of the oscillators 29—32, through transformers 35—38, cause thyratron type valves 39—42 to fire, thus rendering valves 12—15 conducting and permitting the passage of current to the weld. At the end of a predetermined weld duration valve 25 fires rendering valve 26 non-conducting and energizing relay 43 which may reduce the current flow to the weld or cause a decaying post heat current to flow to the weld. At the end of a predetermined post heat time valve 23 is rendered conducting to send an impulse through peaking type transformer 44 which is operative to cause opening of contacts 20 and 21 to end the cycle.

In order to accurately time the duration of the weld and post heat I provide gaseous discharge valves 22—26. Anode-cathode voltage for the valves 22—26 is provided by a full-wave rectifier 45 and an associated filter 46. A negative grid biasing potential is provided between conductors 47 and 48 by means of transformer 49, rectifier 50 and associated filtering device 51. Contacts 20 and 21 are controlled by a conventional sequence panel, not shown, which is utilized to control the sequence of operation of the welding apparatus, and which may also be utilized to control the duration of such operation as do not require precise timing.

Closing of the contacts 20 and 21 applies anode-cathode or plate voltage to valves 22—26, and negative grid biasing potential is applied to valves 22, 24 and 26 to prevent them from firing. Valve 23, however, having a highly positive grid fires immediately to send an impulse through the primary winding of transformer 44. The secondary of transformer 44 is connected to the aforementioned sequencing panel, not shown, and the impulse thus sent may be used to initiate or terminate an accompanying operation. The peaking transformer 27 is operative to impress a positive potential upon the control grid 53 of valve 22 during alternate half cycles to thus render it conducting. A rectifier 54 is connected across the secondary of transformer 27. Connected in series with the valve 22 is the peaking transformer 28 which is operative to impress an instantaneous positive control grid bias on valves 24 and 26 to cause them to fire. Valves 23 and 25, being connected in conventional "flip-flop" arrangement to valves 24 and 26 respectively, are rendered non-conducting when said last mentioned valves begin to conduct.

Passage of current through the valve 24 provides a voltage drop across resistor 55 and thus establishes a potential difference between conductors 56 and 57 which connect the cathode and anode respectively of oscillator tubes 29—32. A normal D. C. control grid bias potential is maintained on the oscillators 29—32 by means of a potentiometer 58 which is connected to the control grid of each oscillator by means of conductors 59, 60, 61, 62 and 63. This bias normally maintains the oscillators 29—32 in a non-conducting state. In order to render the oscillators conducting I have provided a pair of transformers 33 and 34 to superimpose an alternating voltage upon the cathodes of the oscillators. Each transformer 33 and 34 has two secondary windings; 33' and 33" or 34' and 34". These windings, in the order stated, are connected in series with the cathodes of the oscillators 29—30 respectively. It should be noted however that secondaries 33' and 33" are connected to cathodes 29c and 30c in such a manner as to impress alternating potentials thereon which are 180° electrical degrees out of phase. Secondaries 34' and 34" are connected in a similar manner to cathodes 31c and 32c. The primary winding of transformer 33 is connected to lines L1 and L3 of the three-phase supply through transformer 64. Potentiometer 65 and capacitor 66 regulate the phase relationship of the voltage across the primary of transformer 33 with regard to the voltage across L1 and L2. Potentiometer 67 is connected in series with potentiometer 65, but is short circuited by contacts 43d of relay 43 during welding. The primary winding of transformer 34 is connected in variable phase relationship with supply conductors L1 and L2 in a similar manner. The phase controlling components in this instance comprising potentiometers 68 and 69 and capacitor 70.

As may be understood, then, the voltage impressed by secondary 33' upon the cathode of valve 29 will render it conducting by causing the cathode 29c to become sufficiently negative with respect to the control grid 29g. A resistor 71 placed in series with the cathode 29c and a capacitor 72 connected in shunt relation with the valve 29 cause it to oscillate rapidly during that time when the superimposed A. C. voltage is sufficient to overcome the D. C. bias voltage. The range of oscillation may be varied from zero to a complete half cycle of the source by varying the normal D. C. control grid bias. This may be accomplished by appropriate setting of the potentiometer 58. Oscillators 30, 31 and 32 are controlled in a manner similar to that of oscillator 29. It will be noted however that oscillator 30, receiving a voltage impression from secondary winding 33" will oscillate 180° out of phase with oscillator 29. The same relationship is, of course, maintained between oscillators 31 and 32.

Connected in series with the anodes of the oscillators 29—32 are the primary windings of transformers 35—38. The secondary windings of these transformers are connected between the cathode and control grid of thyratron type valves 39—42. A normal negative grid bias is maintained on valves 39—42 by means of transformers 73 and associated filtering apparatus 74. Each valve 39—42 is connected to one of the ignitron type valves 12—15 and serves as an ignitor therefor. It may be observed that, for example, when oscillator 29 is oscillating valve 39 will fire when a positive potential is applied between its plate and cathode. The resulting current flow will render the associated ignitron 13 conducting to allow the passage of welding current to the transformer 11. Since the same voltage is applied across the cathode and plate of both the ignitron 13 and its associated thyratron 39, both will conduct at exactly the same time. Ignitron 12 will conduct 180° electrical degrees out of phase with the inversely connected ignitron 13 to thereby provide alternating flow of current in the supply line L3. It is understood of course that ignitrons 14 and 15 are similarly operated and they therefore will not be separately described.

The firing point of the thyratron valves 39—42 may be varied over a range of 90° by means of varying the normal D. C. grid bias on the oscillators 29—32, and it may also be varied over substantially a 90° range by shifting of the phase of the cathode of the A. C. voltage impressed upon the cathode of the oscillators with respect to the associated line voltage. It may be understood, then, that the firing of the ignitron valves 12—15 may be varied substantially over a complete half cycle. In this manner I provide means of accurately regulating the current flow to the weld over substantially the entire range from full conduction to zero.

It is sometimes desirable to gradually raise the current to full welding value to provide a preheat period, and it is even more important to provide a post-heat period by allowing the current to decay gradually upon completion of the weld to thereby avoid undue stresses caused by uneven heating and cooling of the metal. As explained above, it is possible to vary the range of conduction of the ignitrons 12—15 substantially over a 90° range by proper variation of the grid bias voltage on oscillators 29—32. In the specific control circuit illustrated I have provided an arrangement whereby at the end of the weld time the biasing grid voltage of the oscillator tube will fall at a controlled rate, as determined by the rate of discharge of a capacitor for example to thereby provide an essentially gradual decay of the weld current during the post-heat period. Of course, a similar arrangement could as well be provided to gradually raise the grid biasing potentials applied to the oscillators at the start of a welding current flow to thereby effect a preheat period in which the heat and/or welding current is caused to rise gradually according to a predetermined pattern. Also, if desired I may provide suitable arrangements whereby at the start of a welding cycle a lower grid potential of constant value may be applied to the oscillators for a predetermined time to thereby effect a preheat period of constant current intensity and of controlled duration. As the description herein proceeds it will become apparent to those skilled in the art as to how these modifications and/or additions may be applied to the specific circuit herein illustrated.

To provide for the gradual lowering of the control grid potentials applied to the oscillator tubes 29—32 at the end of the principal welding phase to thereby effect a downward sloping post-heat current I provide a capacitor 75 one side of which is connected to the grids of the tubes 29—32 through a conductor 63 while the other side is connected through a switch 76 and conductor 77 to conductor 78. During the actual welding phase the capacitor 75 is charged to the potential drop appearing across resistor 79 and the lower portion of potentiometer 58—the charging circuit being traceable through conductor 77, switch 76, capacitor 75, conductor 63, conductor 62, contacts C of relay 43, conductor 61, switch 76, conductor 60, potentiometer 59, and resistor 79. At this time the potential of conductor 78 is that of conductor 57, being highly positive, so that a highly positive grid potential is applied to the oscillators, conditioning them for full conduction. Immediately, however, upon timing out of the weld period, in the manner hereinafter more fully explained, and the consequent firing of tube 25 the relay 43 is energized through the circuit comprised of the conductor 85, switch 86, conductor 87, solenoid of relay 43, conductor 88, and tube 25 to conductor 47. This opens contact C of relay 43 to remove the tap of potentiometer 58 from connection with the grid side of capacitor 75 and closes contact A to connect this side of capacitor 75 to the tap of a lower potentialed potentiometer 89 through potentiometer 90, the setting of which determines the rate at which capacitor 75 charges to gradually lower the potential applied to the control grids of the oscillators 29—32 through conductor 63.

In order to control the duration of the weld and post-heat times in an accurate and sensitive manner I provide suitable interconnection between valves 25 and 26, by means of which the valve 25 is operative after a predetermined time to simultaneously begin conducting and render valve 26 non-conducting whereby the weld time is ended and the post-heat time is initiated. Similar interconnection between valves 23 and 24 operate after a predetermined time, comprising both the weld and post-heat times to simultaneously render valve 23 conducting and valve 24 non-conducting to terminate the flow of post-heat current to the weld.

The above mentioned interconnection, as applied to the valves 25 and 26 comprise a first capacitor 84 connecting the anode of valve 26 to the grid circuit of valve 25, a second capacitor 83 connecting the respective anodes of valves 25 and 26, potentiometer 82 which is connected in series with the grid circuit of valve 25, and a tapped resistor 81 connected in series with the anode of valve 26 and having its variable tap connected to the potentiometer 82. Upon the application of potential between conductors 57 and 47 and after a positive grid impulse to valves 24 and 26 from the transformer 28 the last mentioned valves will conduct to begin the weld.

Prior to the initiation of conduction in valve 26 the timing capacitor 84 is charged by grid rectification of valve 25 whereby the terminal of capacitor 84 which is connected to the grid of valve 24 is made highly negative with respect to the terminal of capacitor 84 which is connected to the anode of valve 26. Upon the firing of valve 26 the grid-connected terminal of capacitor 84 is rendered highly negative with respect to the cathode of valve 25 but this capacitor immediately begins to charge through the timing potentiometer 82 and after this R.-C. timing circuit has timed out its period the grid of valve 25 becomes sufficiently positive with respect to the cathode thereof to initiate conduction in valve 25. Immediately upon firing of the valve 25 the discharge of capacitor 83 momentarily removes the anode potential from valve 26, causing the latter to become extinguished. A similar arrangement is provided between the valves 23 and 24 where the anode interconnected capacitor 90' extinguishes valve 24 upon initiation of conduction in valve 23 and where the valve 23 is caused to conduct upon the expiration of a predetermined time interval following initiation of conduction in valve 24 by means of the timing circuit comprised of tapped resistor 91, capacitor 92, and potentiometer 93. It will be understood that the setting of potentiometer 93 will be such as to include the post-heat time so that the complete control circuit will not be recycled until the expiration of this post-heat period, the resulting impulse applied through transformer 44 being normally utilized by the sequence control panel, not shown, to open the contacts 20 and 21 and to effect mechanical movements in the welding machine with which the control is associated.

To effect consistency in the quantity of energy translated on short welding impulses whether for single impulse weld, multiple impulse spot welding, or seam welding, and to avoid saturation effects in the welding transformer particularly when the sloping post-heat control is not used, I provide for a consistent minimum impulse of 1⅛ cycles of the three-phase source. Longer periods are comprised of this basic period with added increments each of a full cycle of the source in any desired number. This mode of operation is accomplished by initiating conduction in the trigger tube 22 by an impulse derived from one phase through the transformer 27 while the ultimate firing control of the "stop" tube 23 is effected by applying a firing impulse to the screen grid of tube 23 through an impulse transformer 95 the primary of which is connected to a phase shifting circuit comprised of variable resistance 96 and a capacitor 97 and energy from another phase of the source through transformer 64.

It should now be apparent that we have provided an improved control system for translating current to a resistance welding system, particularly of the kind utilizing a three-phase power supply, which accomplishes the objects initially set out. Of primary importance is the dependability and consistency of operation of the system, whereby highly reliable welding results are obtained, and this is brought about primarily by the utilization of circuit components which have no tendency toward erratic operation. Also, the complexity of the control circuits used is proportioned to the multiplicity or complexity of the final results desired so that the likelihood of erratic operation or failure is further reduced. For example, when operating with the preheat or post-heat periods the oscillator tubes 29—32 are conditioned for conduction immediately upon firing of the tube 24 to furnish anode potential as developed across resistor 55 and thereafter the oscillators conduct for preselected portions of the half cycles of the source as determined by the settings of the phase shift potentiometers 65 and 68 which govern the phase relation of the A. C. cathode bias applied to the oscillators through transformers 33 and 34. The oscillators, being designed to generate output signals of the order of 1000 cycles per second, follow with unfailing accuracy the phase relation control effected through the cathode bias and faithfully transmit this control to the control grids of the ignitron firing tubes 39—42 whereby the energy furnished the welding load during any given period of time is regulated in a highly competitive manner.

The control tubes 22—26, being of the dependable gaseous type operate with unfailing accuracy, particularly in relation to or under the control of the simplified timing circuits comprising the potentiometers 82 and 93. With this basic dependable control system in being, we can readily insert in the grid control circuits of the oscillators suitable varying sources of potential whereby a predetermined rate of rise or a lower fixed value of welding current during preheat and/or a predetermined rate of decay or a predetermined lower value of current during post-heat may be attained as desired without affecting the normal actual weld timing or the preset rate of energy translation during the actual welding period.

By the application of the above described precision type of versatile control to an electric resistance welding system of the kind in which the welding current is translated through a multiple phase welding transformer and then rectified by stable dry type of rectifiers before reaching the welding electrodes we provide an electric resistance welding system of much wider versatility and of superior characteristics as regards quality and consistency of results.

Having thus described our invention what we claim as novel and desire to secure by Letters Patent is:

1. In a power control system for a load circuit adapted to be energized from an alternating current source the combination of a pair of inversely related electric discharge valves for controlling the flow of current from said source to said load circuit, each of said valves having a control element and an energizing circuit connected with said control element and including a grid controlled electronic discharge device, a source of direct current potential, oscillating circuits connected across the said direct current potential source and each comprising an electric discharge device, translating devices to impress the oscillations generated by said oscillating circuits onto the control grids of said electronic discharge devices to render the same conducting, means to establish and interrupt in sequence said source of direct current potential comprising an energizing circuit including a gaseous discharge device, means to initiate conduction in said oscillating circuits at a preselected point on the voltage wave of said alternating current source, and means to interrupt conduction in said gaseous discharge device comprising a second gaseous discharge device connected in parallel with said first mentioned gaseous discharge device and a capacitor interconnecting the anodes of said gaseous discharge devices.

2. Apparatus according to claim 1 further including a timing circuit to initiate conduction in said second gaseous discharge device at the expiration of a predetermined time interval following the initiation of conduction in said first mentioned gaseous discharge device.

3. Apparatus according to claim 2 further including a control grid in each of said electric discharge devices of the oscillating circuits, and means to impress a varying control voltage on said last mentioned grids.

4. Apparatus according to claim 1 further including a timing circuit to initiate conduction in said second gaseous discharge device at the expiration of a predetermined time following the initiation of conduction in said first mentioned gaseous discharge device, said electric discharge devices in said oscillating circuits each having a control grid and a cathode, means to impress a periodic control potential of alternating current source frequency between said control grid and cathode, and means to vary the phase deviation of said periodic control potential with respect to the alternating current source voltage wave.

5. In a power control system for a load circuit connected to an alternating current source through a pair of inversely related electric valves each having a control element and an energizing circuit therefor comprising an electronic discharge device having a control member, a source of high frequency alternating current and a translating circuit for impressing voltages derived from said high frequency source onto said control member to cause said electronic discharge device to conduct, means to establish said high frequency current source comprising a controllable gaseous discharge device, means to initiate conduction of said gaseous discharge device at a predetermined point on the voltage wave of the alternating current source, and means to interrupt conduction in said gaseous discharge device, thereby interrupting said high frequency current source comprising a second gaseous discharge device connected in parallel with the first mentioned gaseous discharge device and having its anode connected with the anode of said first mentioned gaseous discharge device by means of a capacitive reactance.

6. Apparatus according to claim 5 further including a timing circuit to initiate conduction in said second gaseous discharge device at the expiration of a predetermined time interval following the initiation of conduction in said first mentioned gaseous discharge device.

7. Apparatus according to claim 6 further characterized in that said source of high frequency current comprises an oscillating circuit having an electric discharge device provided with a control element and a cathode, and means to apply a varying potential between said last mentioned control element and said cathode of alternating current source periodicity and timed to occur at preselected points on the voltage wave of the alternating current source.

8. In a system for controlling the flow of power from an alternating current source to a load circuit and including a pair of reversely connected electric valves each having a control member and an energizing circuit therefor comprising an electric discharge device having a control element, the combination of an oscillating circuit for supplying a periodic control voltage of high frequency, translating means interconnecting said oscillating circuit and said control element to apply periodic control voltages of high frequency to said control element, said oscillating circuit comprising an electric discharge device having a control element and a cathode, means to impress a predetermined and normally fixed potential difference between said last mentioned control element and said cathode a periodic potential difference of alternating current source frequency to initiate conduction in said last mentioned electric discharge device at a predetermined point in each half cycle of the voltage wave of said alternating current source.

9. In electric resistance welding apparatus having a welding transformer, a control system for controlling the flow of alternating current to said transformer comprising a pair of inversely connected electric discharge valves, each of said valves having a control element and an energizing circuit connected with said control element and including a grid controlled discharge device, a high frequency generator associated with each of said grid control devices and operative to impress high frequency potentials to the control grids thereof to initiate and control conduction therein, a time-controlled circuit for energizing said generators, and said generators including circuit arrangements whereby the high frequency oscillations of the output thereof are produced only during predetermined portions of the half cycles of the alternating current source.

10. Apparatus according to claim 9 further characterized in that each of said generators comprises a grid controlled discharge device while said circuit arrangement comprises means to apply a control potential to the cathode thereof which is of the periodicity of the alternating current source and bearing a predetermined phase relation to said source, and further including means to vary the normal fixed potential bias between said cathode and said last mentioned control grid according to a preselected pattern and during predetermined portions of a complete welding cycle.

JOSEPH J. RILEY.
WILLIAM S. DUSTMAN.

No references cited.